(12) United States Patent
Parks et al.

(10) Patent No.: US 8,724,003 B2
(45) Date of Patent: May 13, 2014

(54) MULTIMODE INTERLINE CCD IMAGING METHODS

(75) Inventors: Christopher Parks, Rochester, NY (US); Keith Wetzel, Rochester, NY (US)

(73) Assignee: Truesense Imaging, Inc., Rochester, NY (US)

( * ) Notice: Subject to any disclaimer, the term of this patent is extended or adjusted under 35 U.S.C. 154(b) by 108 days.

(21) Appl. No.: 13/585,171

(22) Filed: Aug. 14, 2012

(65) Prior Publication Data

US 2014/0049676 A1 Feb. 20, 2014

(51) Int. Cl.
*H04N 5/335* (2011.01)

(52) U.S. Cl.
USPC ............ 348/323; 348/317; 348/320; 348/322

(58) Field of Classification Search
CPC ........... H01L 27/14831; H04N 3/1543; H04N 3/1531; H04N 3/1537; H04N 3/155; H04N 3/1575; H04N 9/045; H04N 3/1562; H04N 3/1568
USPC .................................. 348/323, 317, 320, 322
See application file for complete search history.

(56) References Cited

U.S. PATENT DOCUMENTS

| | | |
|---|---|---|
| 4,597,013 A | 6/1986 | Matsumoto |
| 4,746,972 A | 5/1988 | Takanashi et al. |
| 5,426,317 A | 6/1995 | Hirota |
| 6,087,647 A | 7/2000 | Nakashiba |
| 7,508,436 B2 | 3/2009 | Parks |
| 7,782,393 B2 * | 8/2010 | Ward et al. .................... 348/363 |
| 2002/0141002 A1 * | 10/2002 | Takano et al. ................ 358/513 |
| 2008/0179490 A1 * | 7/2008 | Ohno et al. ................ 250/201.1 |
| 2012/0025275 A1 | 2/2012 | Wang |

* cited by examiner

*Primary Examiner* — Twyler Haskins
*Assistant Examiner* — Quang Le
(74) *Attorney, Agent, or Firm* — Howard & Howard Attorneys PLLC

(57) ABSTRACT

In various embodiments, image-capture methods include a mode in which an image is acquired via charge accumulation in multiple regions of an imaging array and read out to one or more outputs, and/or a mode in which an image is acquired via charge accumulation in a first region of an imaging array, held in vertical CCDs of another region of the imaging array, and read out along with a second image acquired via charge accumulation in the first region of the imaging array.

22 Claims, 11 Drawing Sheets

MULTIMODE INTERLINE CCD IMAGING METHODS

TECHNICAL FIELD

The present invention relates, in various embodiments, to the construction, fabrication, and use of charge-coupled-device (CCD) image sensors.

BACKGROUND

CCD image sensors typically include an array of photo-sensitive areas (or "pixels") that collect charge carriers in response to illumination. The collected charge is subsequently transferred from the array of pixels and converted to a voltage from which an image may be reconstructed by associated circuitry. FIG. 1 depicts a conventional interline CCD image sensor 100 that contains an array of photodiodes 110 arranged in columns. A vertical CCD (VCCD) 120 is disposed next to each column of photodiodes 110, and the VCCDs 120 are connected to a horizontal CCD (HCCD) 130. Each photodiode 110 along with its corresponding VCCD 120 constitutes a pixel of the image sensor 100. Following an exposure period, charge is transferred from the photodiodes 110 into the VCCDs 120, which subsequently shift the charge, row-by-row in parallel, into the HCCD. The HCCD then transfers the charge serially to output circuitry 140 that includes, e.g., a floating diffusion sense node and an output buffer amplifier. The charge from the HCCD is converted, pixel-by-pixel, into voltage at the output circuitry 140, and the signal is then transferred to additional circuitry (either on-chip or off-chip) for reconstruction into an image.

Over time, CCD image sensors have grown larger (i.e., incorporated more pixels) and have been utilized in a host of applications, some of which demand high frame rates, e.g., machine vision applications and video display. While innovative CCD image sensor designs incorporating, e.g., multiple output circuits, have enabled higher frame rate, such techniques often cannot provide sufficient performance increases as sensor sizes continue to grow. Furthermore, many CCD image sensors lack the flexibility to operate in multiple modes that trade off resolution for exposure speed. Finally, many CCD imaging methods equipped to capture multiple images in quick succession utilize strobe light sources, as described in U.S. Pat. No. 7,508,436, the entire disclosure of which is incorporated by reference herein, and such light sources are often not suitable for all imaging conditions. Thus, there continues to be a need for CCD-based imaging methods, utilizing a single CCD image sensor, that have the flexibility to provide high-speed imaging modes enabling multiple-image capture without the need for strobe light sources, as well as modes that trade off such speed enhancements for increased resolution.

SUMMARY

Embodiments of the present invention provide the flexibility of multiple imaging modes utilized with the same CCD image sensor, enabling the user to trade off image resolution for image-capture speed. In a first mode the entire pixel area of the interline CCD image sensor is utilized for image capture, and the sensed photocharge is transferred from VCCDs to HCCDs and read out utilizing one or more outputs. In a second mode, only a portion of the pixel array is utilized to capture an image (which is thus captured at a lower resolution than images captured in the first mode), and that image is stored, prior to read out, in the VCCDs of another region of the image sensor. During or after storage of the first image, the imaging region of the image sensor is utilized to capture a second image that is stored in the VCCDs of the imaging region. Thus, at least two distinct images may be stored within the VCCDs of the interline CCD image sensor prior to read out from the HCCDs, which may again take place through one or more outputs. The second mode enables multiple-image capture at extremely high speeds while the first mode provides high-resolution images, although generally at slower frame rates.

In an aspect, embodiments of the invention feature a method of image capture utilizing an image sensor including or consisting essentially of an imaging array (i) comprising a plurality of columns of photo-sensitive regions (PSRs) each associated with a VCCD and (ii) having at least first and second different and independently controllable regions. (Collectively the first and second regions may constitute the entire imaging array or a portion of the imaging array.) In a first image-capture mode, an image is acquired via accumulation of charge in the PSRs of both first and second regions. The accumulated charge in the PSRs of the first region is transferred to VCCDs of the first region, and accumulated charge in the PSRs of the second region is transferred to VCCDs of the second region. Charge in the VCCDs of the first and second regions is transferred to one or more HCCDs electrically connected to the VCCDs, and charge from the one or more HCCDs is read out via one or more output circuits electrically coupled to each HCCD. In a second image-capture mode, a first image is acquired via accumulation of charge in the PSRs of the first region. Accumulated charge in the PSRs of the first region corresponding to the first image is transferred to VCCDs of the first region, and charge corresponding to the first image is transferred from the VCCDs of the first region to VCCDs of the second region. A second image is acquired via accumulation of charge in the PSRs of the first region, and accumulated charge in the PSRs of the first region corresponding to the second image is transferred to VCCDs of the first region. Charge in the VCCDs of the first region corresponding to the second image and charge in the VCCDs of the second region corresponding to the first image are both transferred to one or more HCCDs electrically connected to the VCCDs. Charge from the one or more HCCDs is read out via one or more output circuits electrically coupled to each HCCD.

Embodiments of the invention may include one or more of the following in any of a variety of combinations. In the first image-capture mode, charge in the VCCDs of the first and second regions may be transferred to a single HCCD. Charge may be read out from the single HCCD via one output circuit or via two (or more) different output circuits. In the first image-capture mode, charge in the VCCDs of the first region may be transferred to a first HCCD and charge in the VCCDs of the second region may be transferred to a second HCCD different from the first HCCD. Charge may be read out of the first HCCD via one output circuit electrically coupled thereto or via two (or more) different output circuits electrically coupled thereto. Charge may be read out of the second HCCD via one output circuit electrically coupled thereto or via two (or more) different output circuits electrically coupled thereto. In the first image-capture mode, accumulated charge in the PSRs of the first region may be transferred to VCCDs of the first region and accumulated charge in the PSRs of the second region may be transferred to VCCDs of the second region simultaneously.

In the second image-capture mode, at least a portion of the charge corresponding to the second image may be accumulated in the PSRs of the first region during transfer of charge corresponding to the first image from the VCCDs of the first region to VCCDs of the second region. In the second image-capture mode, charge may accumulate in the PSRs of the second region during (i) accumulation of charge in the PSRs of the first region during acquisition of the first image and/or (ii) accumulation of charge in the PSRs of the first region during acquisition of the second image. In the second image-capture mode, charge in the VCCDs of the first and second regions may be transferred to a single HCCD. Charge may be read out from the single HCCD via one output circuit or via two (or more) different output circuits. In the second image-capture mode, charge in the VCCDs of the first region may be transferred to a first HCCD and charge in the VCCDs of the second region may be transferred to a second HCCD different from the first HCCD. Charge may be read out of the first HCCD via one output circuit electrically coupled thereto or via two (or more) different output circuits electrically coupled thereto. Charge may be read out of the second HCCD via one output circuit electrically coupled thereto or via two (or more) different output circuits electrically coupled thereto.

Each of the first and second regions may include a plurality of contiguous rows of PSRs, and the first and second regions may be contiguous with each other (i.e., collectively form a plurality of contiguous rows of PSRs). In the second image-capture mode, a third image may be acquired via accumulation of charge in the PSRs of the second region. Accumulated charge in the PSRs of the second region corresponding to the third image may be transferred to VCCDs of the second region, and charge corresponding to the third image may be transferred from the VCCDs of the second region to VCCDs of the first region. A fourth image may be acquired via accumulation of charge in the PSRs of the second region. Accumulated charge in the PSRs of the second region corresponding to the fourth image may be transferred to VCCDs of the second region. Charge in the VCCDs of the second region corresponding to the fourth image and charge in the VCCDs of the first region corresponding to the third image may both be transferred to one or more HCCDs electrically connected to the VCCDs. Charge from the one or more HCCDs may be read out via one or more output circuits electrically coupled to each HCCD. Charge may accumulate in the PSRs of the first region during (i) accumulation of charge in the PSRs of the second region during acquisition of the third image and/or (ii) accumulation of charge in the PSRs of the second region during acquisition of the fourth image.

In another aspect, embodiments of the invention feature an image sensor including or consisting essentially of an imaging array, one or more HCCDs, one or more output circuits electrically coupled to each HCCD, and a control system. The imaging array includes or consists essentially of a plurality of columns of PSRs each associated with a VCCD, and the imaging array has at least first and second different and independently controllable regions (which may collectively constitute all or a portion of the imaging array). The HCCDs are electrically connected to the VCCDs. The control system is configured to, in a first image-capture mode, acquire an image via accumulation of charge in the PSRs of both first and second regions, transfer accumulated charge in the PSRs of the first region to VCCDs of the first region, transfer accumulated charge in the PSRs of the second region to VCCDs of the second region, transfer charge in the VCCDs of the first and second regions to at least one of the HCCDs, and read out charge from each of the at least one of the HCCDs via one or more output circuits electrically coupled thereto. The control system is also configured to, in a second image-capture mode, acquire a first image via accumulation of charge in the PSRs of the first region, transfer accumulated charge in the PSRs of the first region corresponding to the first image to VCCDs of the first region, transfer charge corresponding to the first image from the VCCDs of the first region to VCCDs of the second region, acquire a second image via accumulation of charge in the PSRs of the first region, transfer accumulated charge in the PSRs of the first region corresponding to the second image to VCCDs of the first region, transfer (i) charge in the VCCDs of the first region corresponding to the second image and (ii) charge in the VCCDs of the second region corresponding to the first image to at least one of the HCCDs, and read out charge from each of the at least one of the HCCDs via one or more output circuits electrically coupled thereto.

In yet another aspect, embodiments of the invention feature a method of image capture utilizing an image sensor including or consisting essentially of an imaging array (i) comprising a plurality of columns of PSRs each associated with a VCCD and (ii) having at least first and second different and independently controllable regions. (Collectively the first and second regions may constitute the entire imaging array or a portion of the imaging array.) A first image is acquired via accumulation of charge in the PSRs of the first region, and charge accumulates in the PSRs of the second region during accumulation of charge in the PSRs of the first region. Accumulated charge in the PSRs of the first region corresponding to the first image is transferred to VCCDs of the first region, and charge corresponding to the first image is transferred from the VCCDs of the first region to VCCDs of the second region. A second image is acquired via accumulation of charge in the PSRs of the first region, and charge accumulates in the PSRs of the second region during the accumulation of charge in the PSRs of the first region. Accumulated charge in the PSRs of the first region corresponding to the second image is transferred to VCCDs of the first region. Charge in the VCCDs of the first region corresponding to the second image and charge in the VCCDs of the second region corresponding to the first image are both transferred to one or more HCCDs electrically connected to the VCCDs. Charge from the one or more HCCDs is read out via one or more output circuits electrically coupled to each HCCD.

In an additional aspect, embodiments of the invention feature an image sensor including or consisting essentially of an imaging array, one or more HCCDs, one or more output circuits electrically coupled to each HCCD, and a control system. The imaging array includes or consists essentially of a plurality of columns of PSRs each associated with a VCCD, and the imaging array has at least first and second different and independently controllable regions (which may collectively constitute all or a portion of the imaging array). The HCCDs are electrically connected to the VCCDs. The control system is configured to acquire a first image via accumulation of charge in the PSRs of the first region, charge accumulating in the PSRs of the second region thereduring, transfer accumulated charge in the PSRs of the first region corresponding to the first image to VCCDs of the first region, transfer charge corresponding to the first image from the VCCDs of the first region to VCCDs of the second region, acquire a second image via accumulation of charge in the PSRs of the first region, charge accumulating in the PSRs of the second region thereduring, transfer accumulated charge in the PSRs of the first region corresponding to the second image to VCCDs of the first region, transfer (i) charge in the VCCDs of the first region corresponding to the second image and (ii) charge in the VCCDs of the second region corresponding to the first image to at least one of the HCCDs, and read out charge from each of the at least one of the HCCDs via one or more output circuits electrically coupled thereto.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "approximately" and "substantially" mean ±10%, and in some embodiments, ±5%. The term "consists essentially of" means excluding other materials that contribute to function, unless otherwise defined herein. Nonetheless, such other materials may be present, collectively or individually, in trace amounts.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
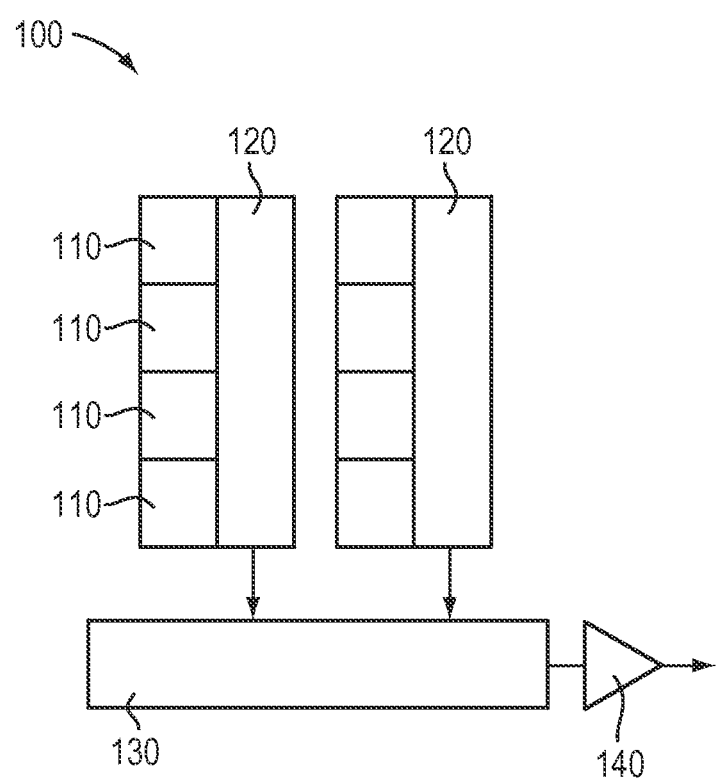
FIG. 1 is a block diagram of a conventional CCD image sensor.
Figure 2A:
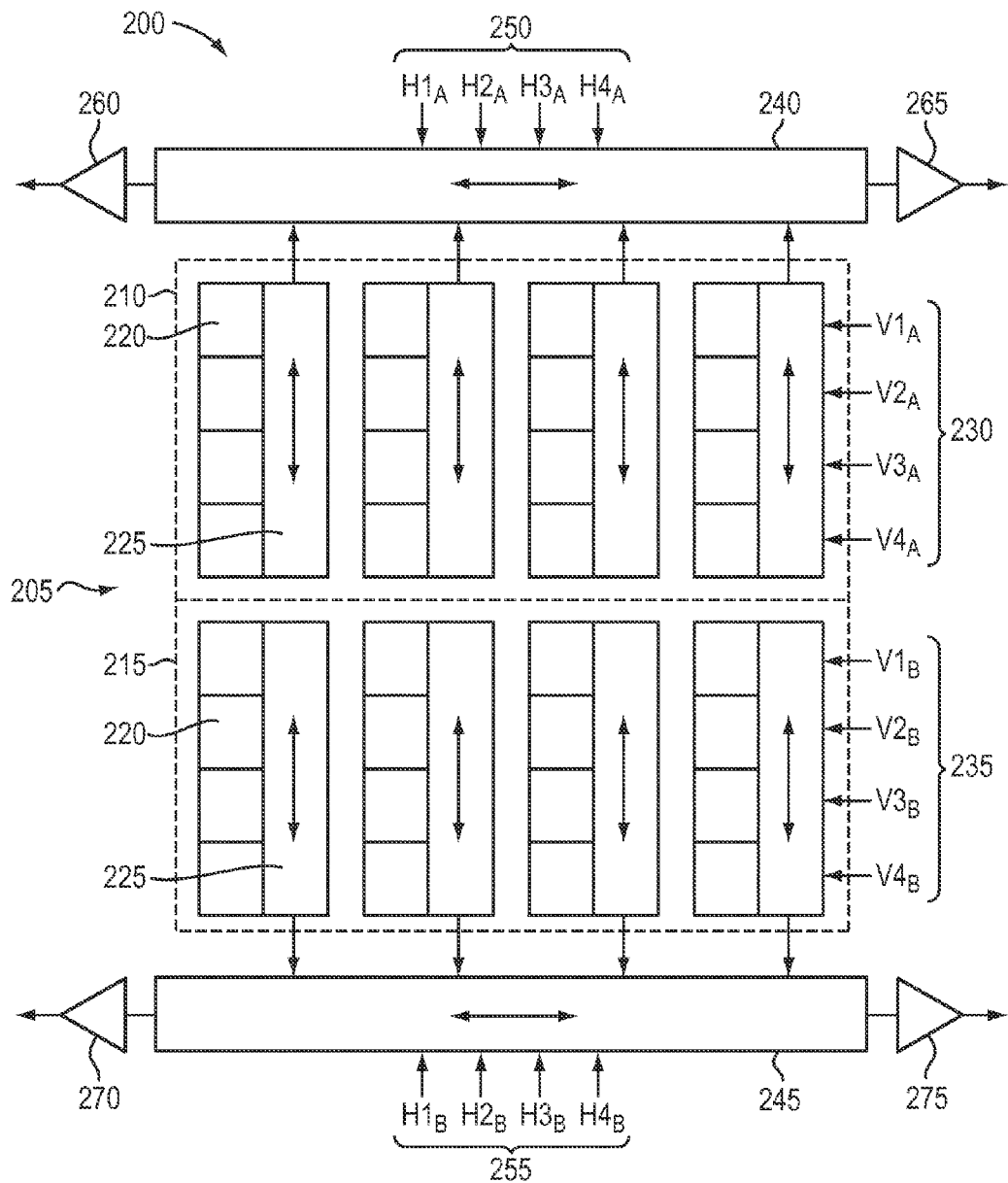
FIGS. 2A and 2B are block diagrams of portions of a CCD image sensor utilized in accordance with various embodiments of the invention.

FIG. 2A schematically depicts an interline CCD image sensor 200 utilized in embodiments of the present invention. Image sensor 200 features an imaging array 205, multiple regions of which may be wired for independent control. As shown, the imaging array 205 is divided into two regions 210, 215, although embodiments of the invention may feature more than two independently wired regions. Each region 210, 215 contains columns of photo-sensitive regions (PSRs) 220 and a VCCD 225 associated with each column of PSRs. Each PSR 220 and its associated VCCD 225 (or portion thereof proximate the PSR 220) constitute a "pixel" of the imaging array 205. Each PSR 220 includes or consists essentially of a region (typically a semiconductor region) that produces charge (i.e., "photocharge") when exposed to light. Exemplary PSRs 220 include photodiodes, photodetectors, photoconductors, and/or photocapacitors. Each VCCD 225 typically includes or consists essentially of multiple individual shift-register elements that charge may be serially transferred to and from, as known in the art. (Although the columns of PSRs 220 and VCCDs 225 are depicted in FIG. 2A and subsequent figures with a schematic break to illustrate the extent of each region of the imaging array for clarity, typically the PSRs 220 and VCCDs 225 extend between regions without physical or electrical interruption.) As shown, each region 210, 215 is preferably a region of contiguous rows of PSRs 220. As mentioned above, each region 210, 215 is wired for independent operation, as schematically indicated by control lines 230, 235. Each of the sets of control lines 230, 235 typically contains multiple control lines, depending on the details of electrical operation of image sensor 200. For example, image sensor 200 is shown as a four-phase CCD image sensor in which each set of control lines 230, 235 contains four separate control lines, but embodiments of the invention feature different modes of operation, e.g., two-phase operation. The control lines 230, 235 are utilized to control charge transfer within the VCCDs 225 and enable bidirectional charge transfer therein, as indicated by the double-headed arrows within VCCDs 225. That is, charge may be moved "up" or "down" in VCCDs 225 depending on the order or polarity of the control signals on control lines 230, 235.

Each VCCD 225 may transfer charge to one or both of HCCDs 240, 245 located on opposite sides of the imaging array 205. Similar to VCCDs 225, bidirectional charge transfer is enabled in HCCDs 240, 245 via independent sets of control lines 250, 255, which are utilized to transfer charge within HCCDs 240, 245 to one or more of the output circuits 260, 265, 270, 275, each of which may include or consist essentially of, e.g., a sense node (e.g., a floating diffusion) and an output buffer amplifier. (In subsequent figures, control lines 230, 235, 250, 255 are omitted for clarity.) As known in the art, output circuits 260, 265, 270, 275 each convert charge received from an HCCD into voltage signals that are utilized downstream to reconstruct images sensed by imaging array 205. Each HCCD 240, 245 typically includes or consists essentially of multiple individual shift-register elements that charge may be serially transferred to and from, as known in the art.

In some embodiments of the present invention, image sensor 200 may resemble, and be fabricated similarly to, multiple-output CCD image sensors detailed in U.S. Pat. No. 4,746,972, U.S. Pat. No. 6,087,647, and U.S. Patent Application Publication No. 2012/0025275, the entire disclosure of each of which is incorporated by reference herein.

Figure 2B:
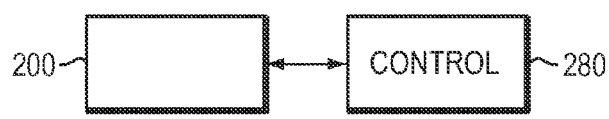

FIG. 2B schematically depicts image sensor 200 linked to a controller (or "control system") 280 that controls various operations of image sensor 200, including image capture (by, e.g., control of a mechanical shutter or electronic shutter operation) and read out. The controller 280 may be a general-purpose microprocessor, but depending on implementation may alternatively be a microcontroller, peripheral integrated circuit element, a customer-specific integrated circuit (CSIC), an application-specific integrated circuit (ASIC), a logic circuit, a digital signal processor, a programmable logic device such as a field-programmable gate array (FPGA), a programmable logic device (PLD), a programmable logic array (PLA), an RFID processor, smart chip, or any other device or arrangement of devices that is capable of implementing the steps of the processes of the invention (such as those described in detail below). The controller 280 may be monolithically integrated with, and thus a portion of the same integrated-circuit chip as, image sensor 200, or controller 280 may be disposed on a chip separate and discrete from the chip containing image sensor 200 (and interconnected thereto by wired or wireless means). Moreover, at least some of the functions of controller 280 may be implemented in software and/or as mixed hardware-software modules. Software programs implementing the functionality herein described may be written in any of a number of high level languages such as FORTRAN, PASCAL, JAVA, C, C++, C#, BASIC, various scripting languages, and/or HTML. Additionally, the software may be implemented in an assembly language directed to a microprocessor resident in controller 280. The software may be embodied on an article of manufacture including, but not limited to, a floppy disk, a jump drive, a hard disk, an optical disk, a magnetic tape, a PROM, an EPROM, EEPROM, field-programmable gate array, CDROM, or DVDROM. Embodiments using hardware-software modules may be implemented using, for example, one or more FPGA, CPLD, or ASIC processors.

Figure 3A:
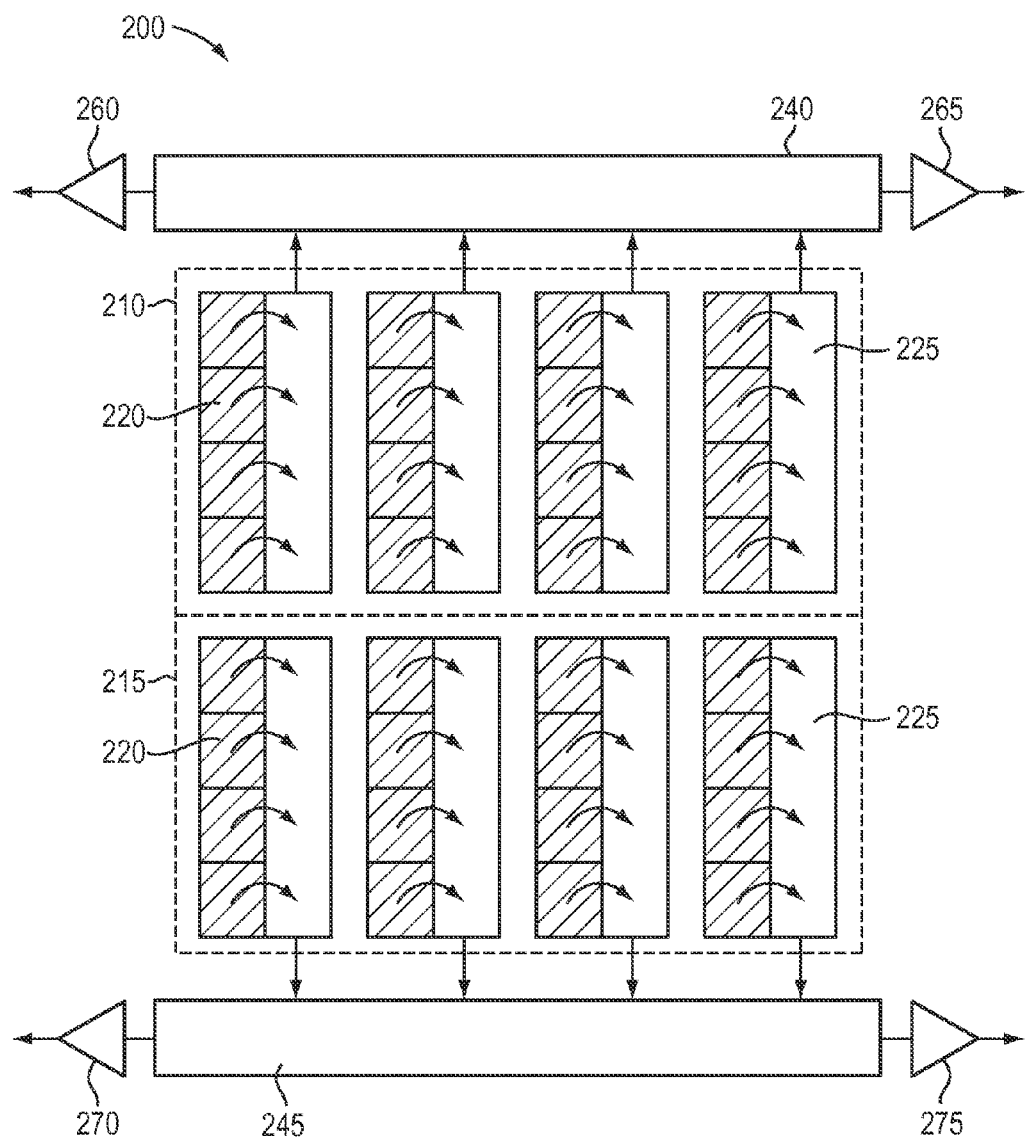
FIGS. 3A-3C depict various stages of a first imaging mode utilizing the image sensor of FIG. 2A according to various embodiments of the invention.
Figure 3B:
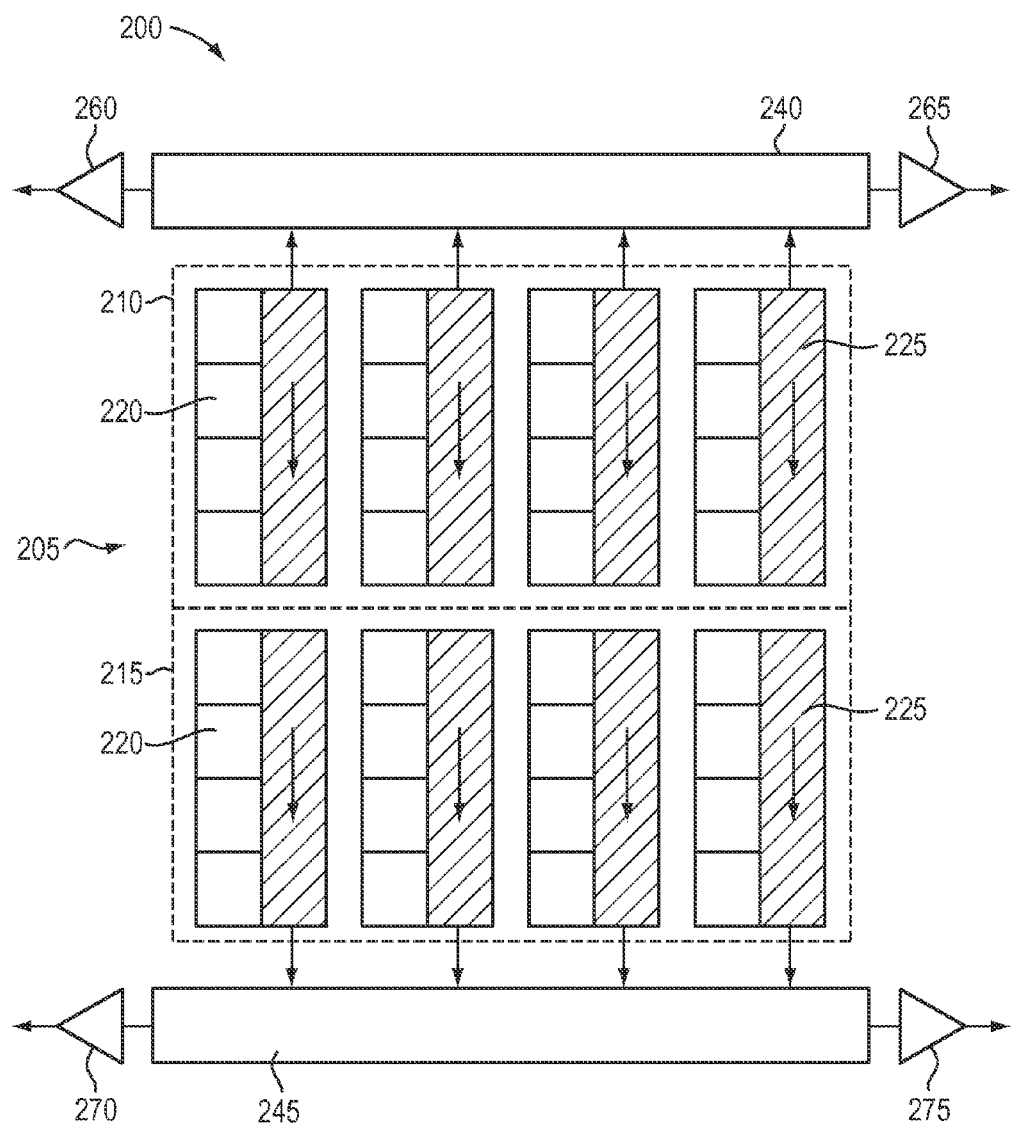
Figure 3C:
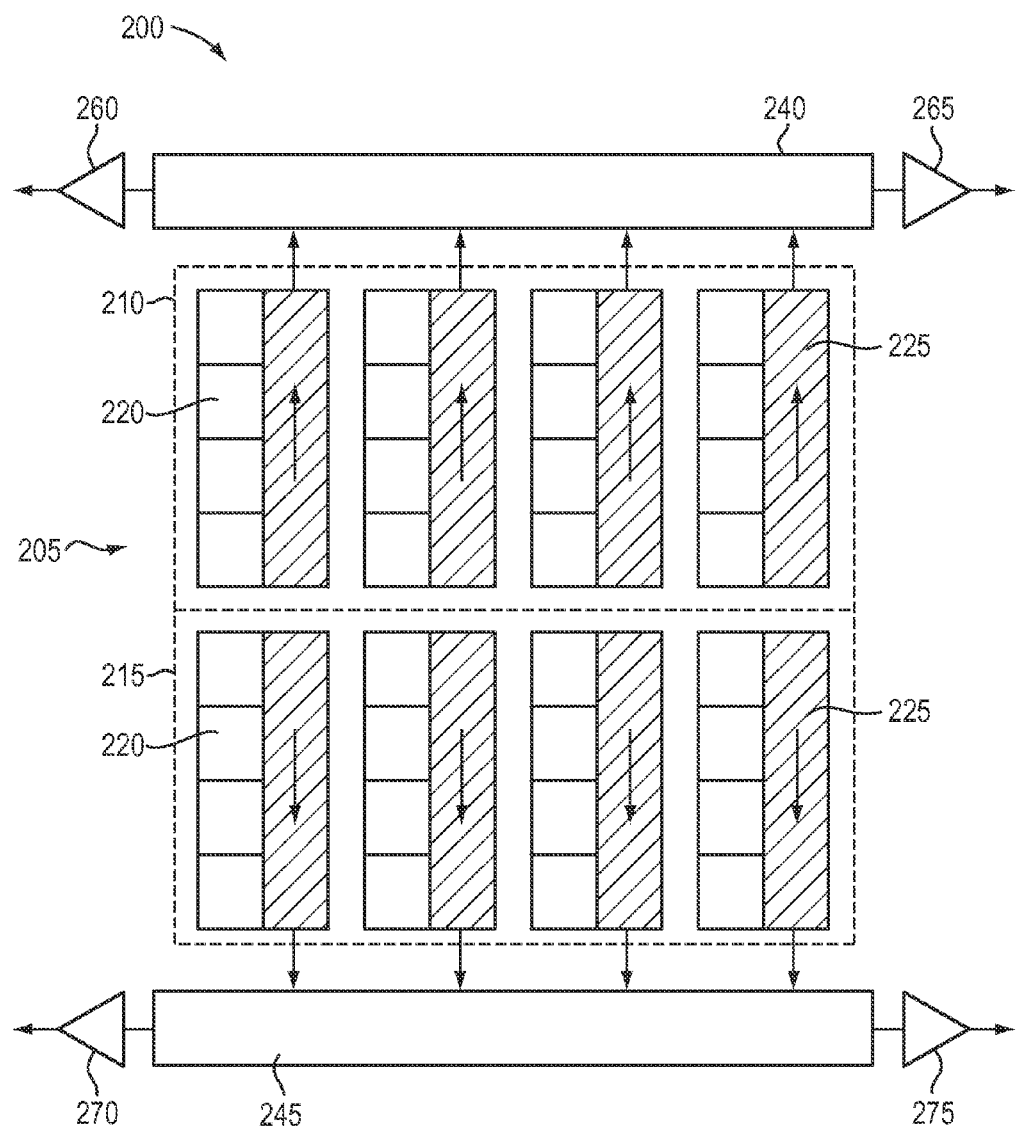

FIGS. 3A, 3B, and 3C illustrate various aspects of a first imaging mode in which image sensor 200 is utilized under control of controller 280 in accordance with embodiments of the present invention. As shown in FIG. 3A, an image is captured utilizing PSRs 220 in both regions 210, 215, resulting in accumulation of charge within the PSRs 220, as indicated by the shading therein. After the image is captured (i.e., after the integration time for PSRs 220), the charge in PSRs 220 in both regions 210, 215 is transferred into the VCCDs 225 for read out. Once the charge in PSRs 220 is transferred into the VCCDs 225, another image-capture sequence may be initiated with PSRs 220. (The charge corresponding to this second image may be transferred to VCCDs 225 once the charge corresponding to the first image has been transferred to the HCCDs, as detailed below, or the charge corresponding to the second image may be transferred to VCCDs 225 prior to transfer of charge therein to the HCCDs, thereby combining, or "binning" the charge corresponding to the two images.) As shown in FIG. 3B, the charge in the VCCDs 225 in both regions 210, 215 may be serially transferred to HCCD 245 and thence to one or both output circuits 270, 275. Thus, FIG. 3B depicts either one-output or two-output readout from the imaging array 205. Alternatively, as shown in FIG. 3C, the charges within the VCCDs 225 in region 210 may be transferred to HCCD 240 while the charges within the VCCDs 225 in region 215 are transferred to HCCD 245. Then, the charges within HCCD 240 may be read out from either or both of output circuits 260, 265, and the charges within HCCD 245 may be read out from either or both of output circuits 270, 275. Thus, FIG. 3C depicts two-, three-, or four-output readout from the imaging array 205. Because the imaging mode depicted in FIGS. 3A-3C utilizes the PSRs 220 in both regions 210, 215 (e.g., the entirety of imaging array 205), the captured images have high resolution.

Figure 4A:
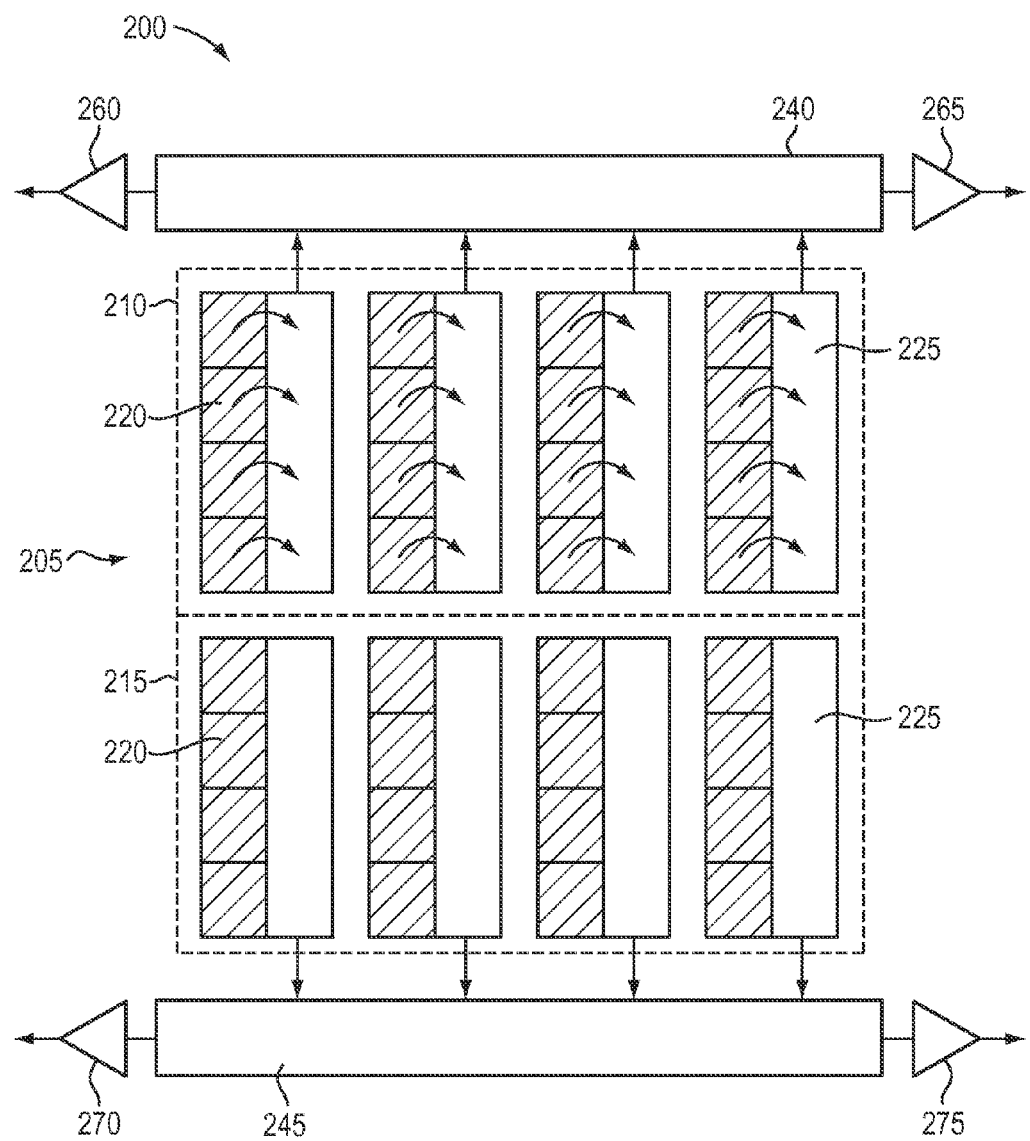
FIGS. 4A-4E depict various stages of a second imaging mode utilizing the image sensor of FIG. 2A according to various embodiments of the invention.
Figure 4B:
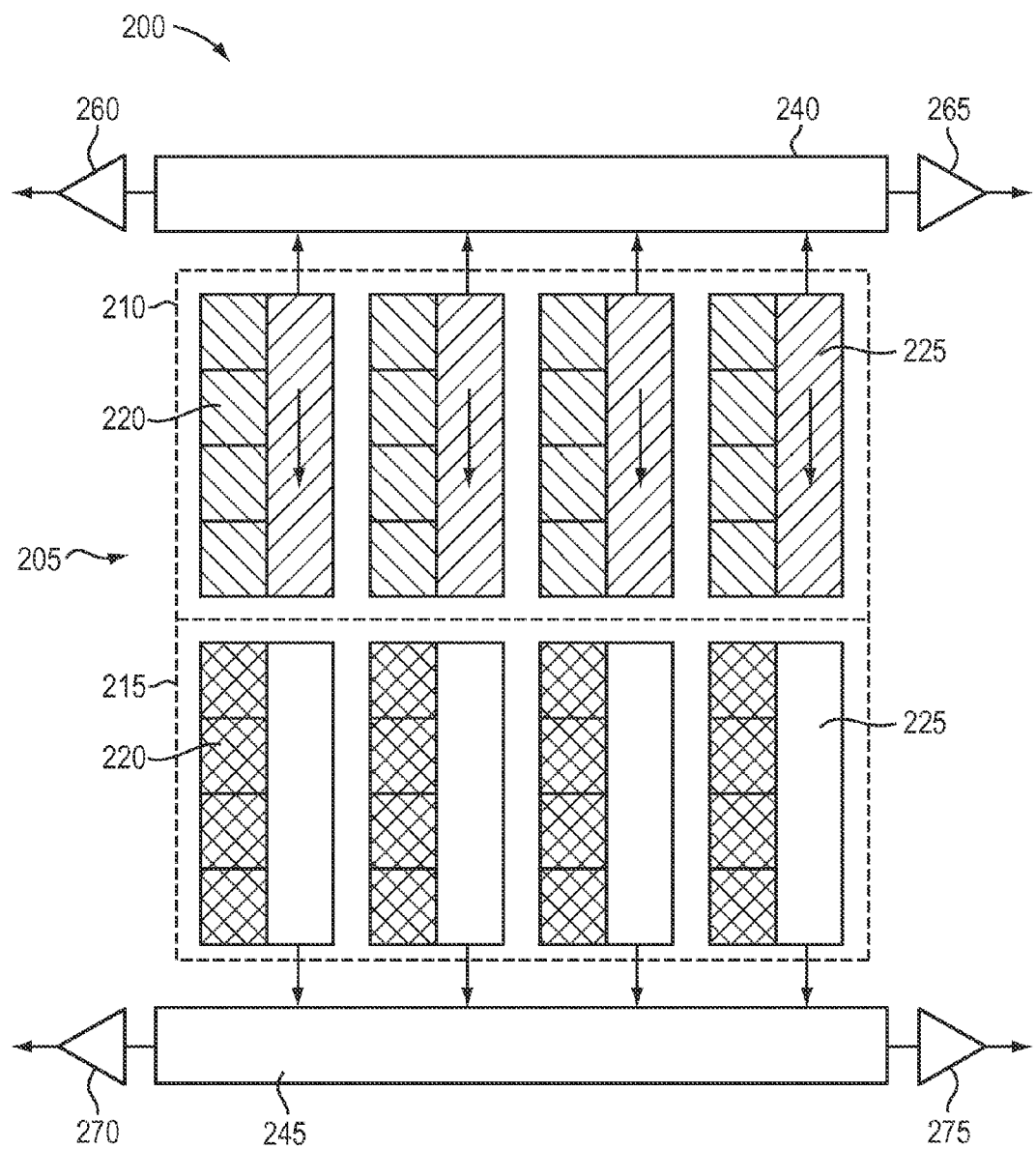

FIGS. 4A-4E illustrate various aspects of a second imaging mode in which image sensor 200 is utilized under control of controller 280 in accordance with embodiments of the present invention. As shown in FIG. 4A, an image is captured utilizing PSRs 220 in region 210 resulting in accumulation of charge within the PSRs 220, as indicated by the shading therein. As indicated, charge may also accumulate within the PSRs 220 of region 215, but, as detailed below, such charge will not be read out in the second imaging mode. After the image is captured (i.e., after the integration time for PSRs 220), the charge in PSRs 220 in the region 210 is transferred into the VCCDs 225 for read out. Once the charge in PSRs 220 is transferred into the VCCDs 225, another image-capture sequence may be initiated with PSRs 220 in region 210 (and region 215, although again the resulting charge will not be read out in the second imaging mode). As shown in FIG. 4B, the charge within the VCCDs in region 210 is moved into the VCCDs in region 215 prior to or during the acquisition of additional charge (i.e., image capture of a second image) in the PSRs 220 of region 210, as indicated by the different shading in those PSRs 220. (As mentioned above, photocharge may also accumulate in the PSRs 220 in region 215, and this charge accumulation may even be additive to the charge already accumulated in FIG. 4A, as indicated by the heavy shading in PSRs 220 in region 215 in FIG. 4B. This photocharge in the PSRs 220 in region 215 may be discarded after one or both of the image captures of the first or second images by, e.g., draining the charge into lateral or vertical overflow drains associated with the PSRs 220 in region 215, the structure and operation of such lateral or vertical overflow drains being known to those of skill in the art.

Figure 4C:
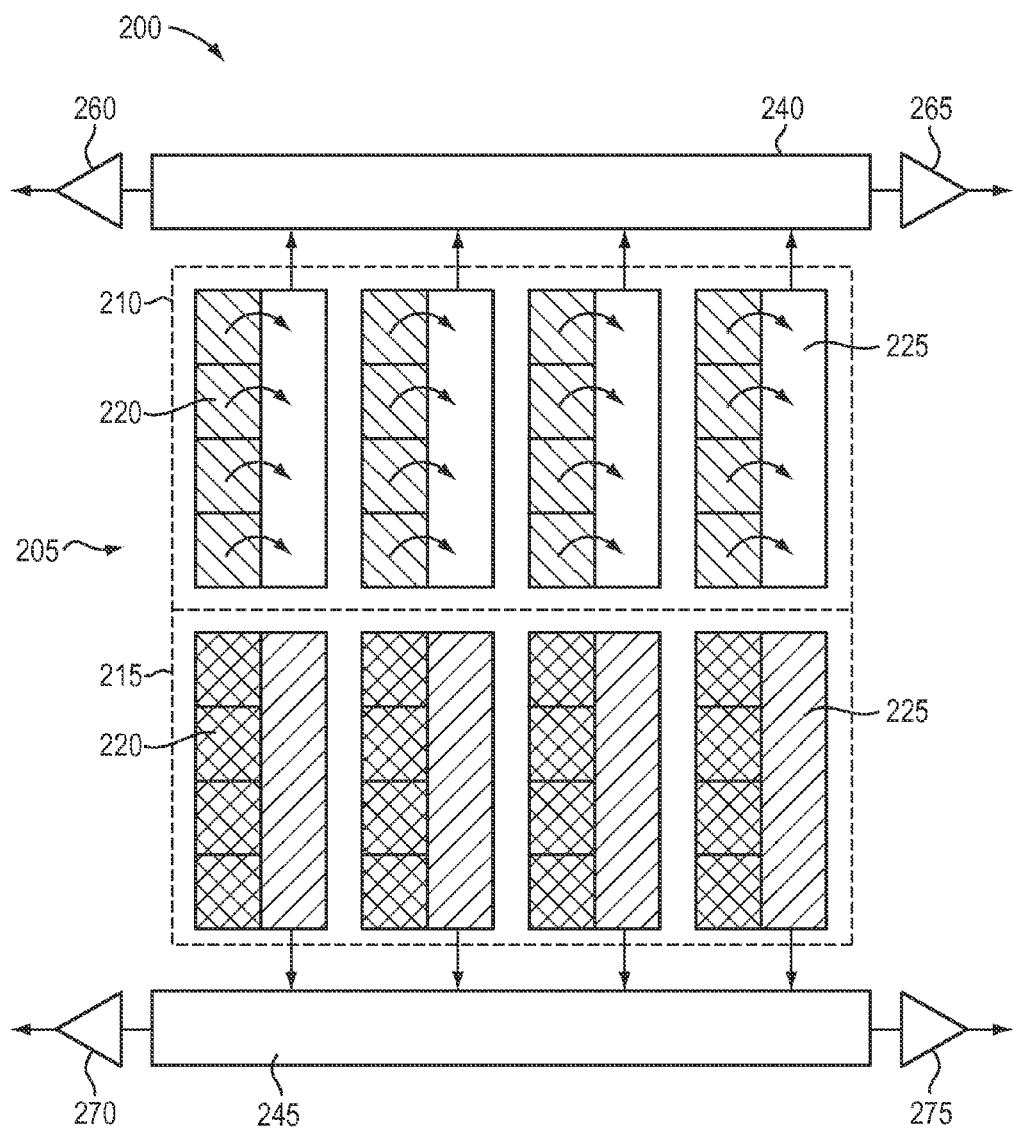

Once the charge from the VCCDs 225 in region 210 has been transferred to the VCCDs 225 in region 215 and the second image has been acquired in the PSRs 220 in region 210, as shown in FIG. 4C, the charge corresponding to the second acquired image is transferred to the now-empty VCCDs 225 in region 210. Thus, the VCCDs 225 in imaging array 205 hold charge corresponding to two (and may hold charge corresponding to even more images, depending on the relative sizes of region 210, 215, and any additional independently controllable regions defined in imaging array 205). This image-capture sequence is thus substantially analogous to a "frame-transfer" CCD, but of course is performed with the interline CCD image sensor 200 rather than a specialized frame-transfer CCD architecture. Furthermore, since both images were captured utilizing only PSRs 220 in region 210, they will have lower resolution than images captured in the first imaging mode described above.

Figure 4D:
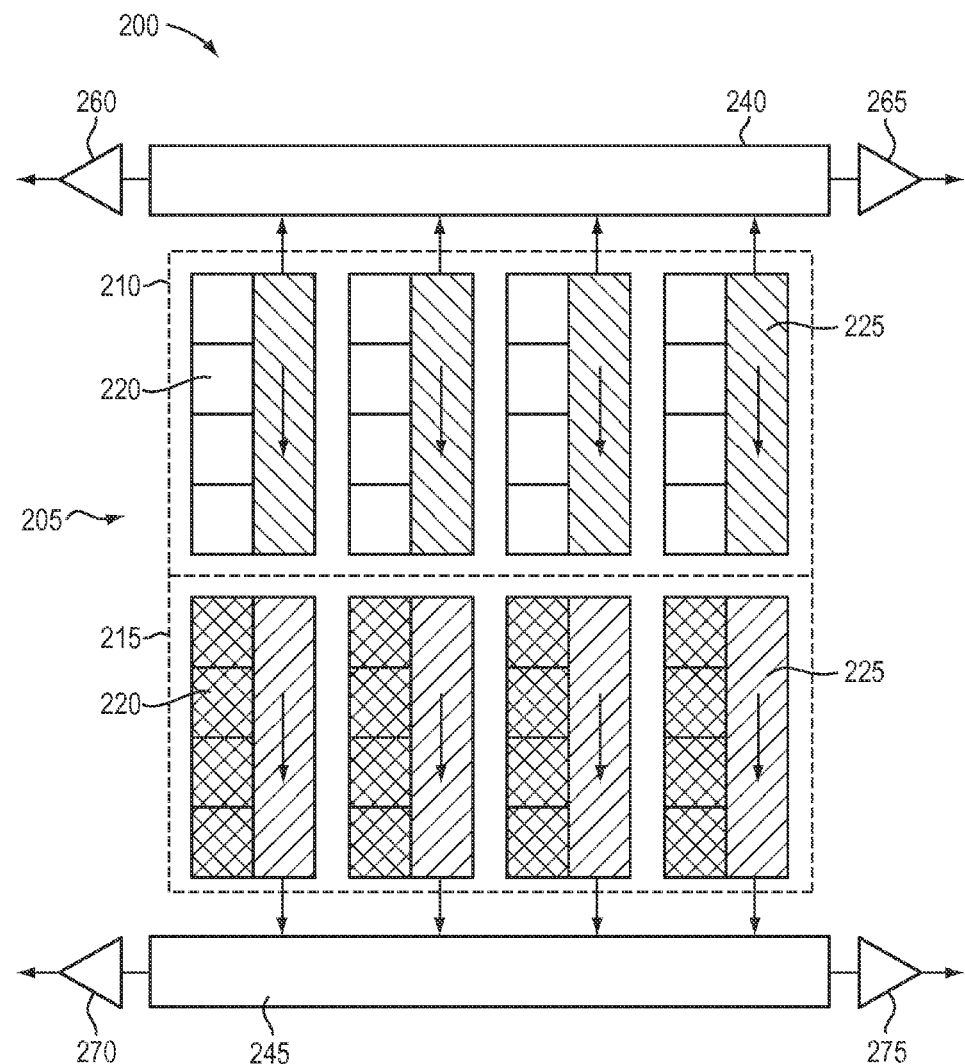
Figure 4E:
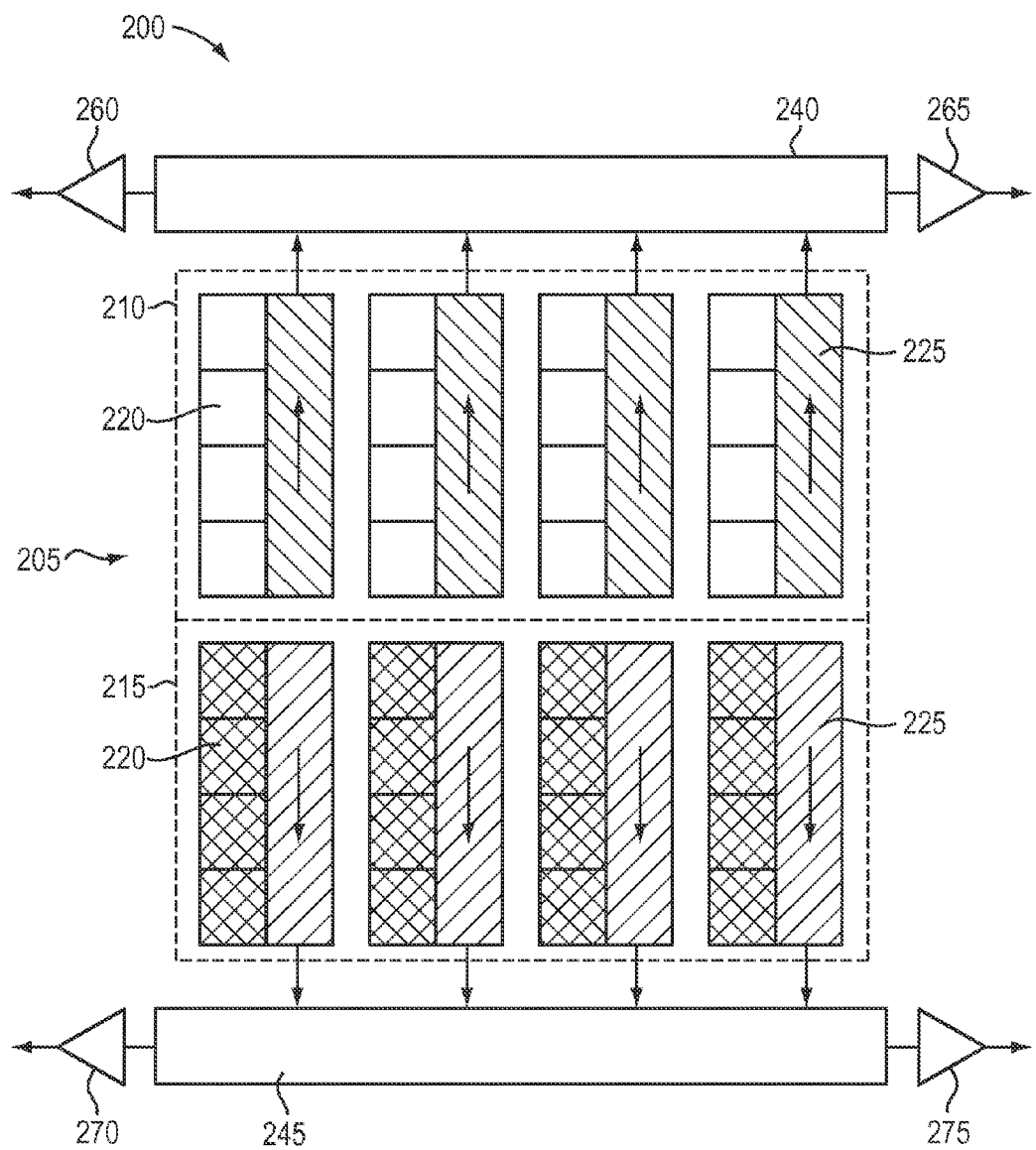

The charge corresponding to the multiple captured images is then transferred to one or both HCCDs 240, 245 for readout. As shown in FIG. 4D, the charge corresponding to the first and second images (the first being held in the VCCDs 225 in region 215 and the second being held in the VCCDs 225 in region 210) may be serially read out to the same HCCD (HCCD 245 as shown in FIG. 4D). From the HCCD 245, the charge corresponding to both images may be read out from one or both of the output circuits 270, 275. Alternatively, as shown in FIG. 4E, the charge corresponding to the first captured image (stored in VCCDs 225 in region 215) may be read out to HCCD 245 while simultaneously the charge corresponding to the second captured image (stored in VCCDs 225 in region 210) may be read out to HCCD 240. The images may then be read out by two, three, or all four of the output circuits 260, 265, 270, 275 (as described above relative to the first imaging mode). During or after the readout sequences depicted in FIGS. 4C, 4D, and 4E, another image may be captured with the PSRs 220 of region 210 (or alternatively the PSRs 220 of region 215—region 210 or region 215 may be utilized to capture subsequent images in the second imaging mode in operations analogous to those depicted in FIGS. 4A-4E).

The second imaging mode may be utilized to vastly enhance the speed of image capture of CCD image sensor 200. The table below compares the minimum time between capture of two images for a variety of different image sensors for (i) the first imaging mode utilizing four output circuits for read out and (ii) the second imaging mode utilizing one, two, or four outputs. As shown, the second imaging mode may be between 6 and 10 times faster for image capture of two images than the first imaging mode.

| Image Sensor | Total Resolution (Megapixels) | First Mode Time (ms) | Second Mode Time (ms) |
|---|---|---|---|
| A | 28.8 | 250 | 36 |
| B | 15.7 | 128 | 26 |
| C | 8.1 | 63 | 4.8 |
| D | 4.1 | 35.7 | 7.4 |
| E | 2.1 | 15.6 | 1.5 |
| F | 1.0 | 8.3 | 1.0 |

Embodiments of the invention advantageously utilize charge binning within the VCCDs, as described in U.S. patent application Ser. No. 12/570,048, filed on Sep. 30, 2009, U.S. Pat. No. 7,385,638, filed on Apr. 28, 2004, U.S. Pat. No. 7,893,981, filed on Feb. 28, 2007, and U.S. Pat. No. 7,948,534, filed on Oct. 22, 2008, the entire disclosure of each of which is incorporated by reference herein. Embodiments of the invention feature an electronic shutter and associated control circuitry, as described in U.S. patent application Ser. No. 12/770,811, filed on Apr. 30, 2010, the entire disclosure of which is incorporated by reference herein.

Figure 5:
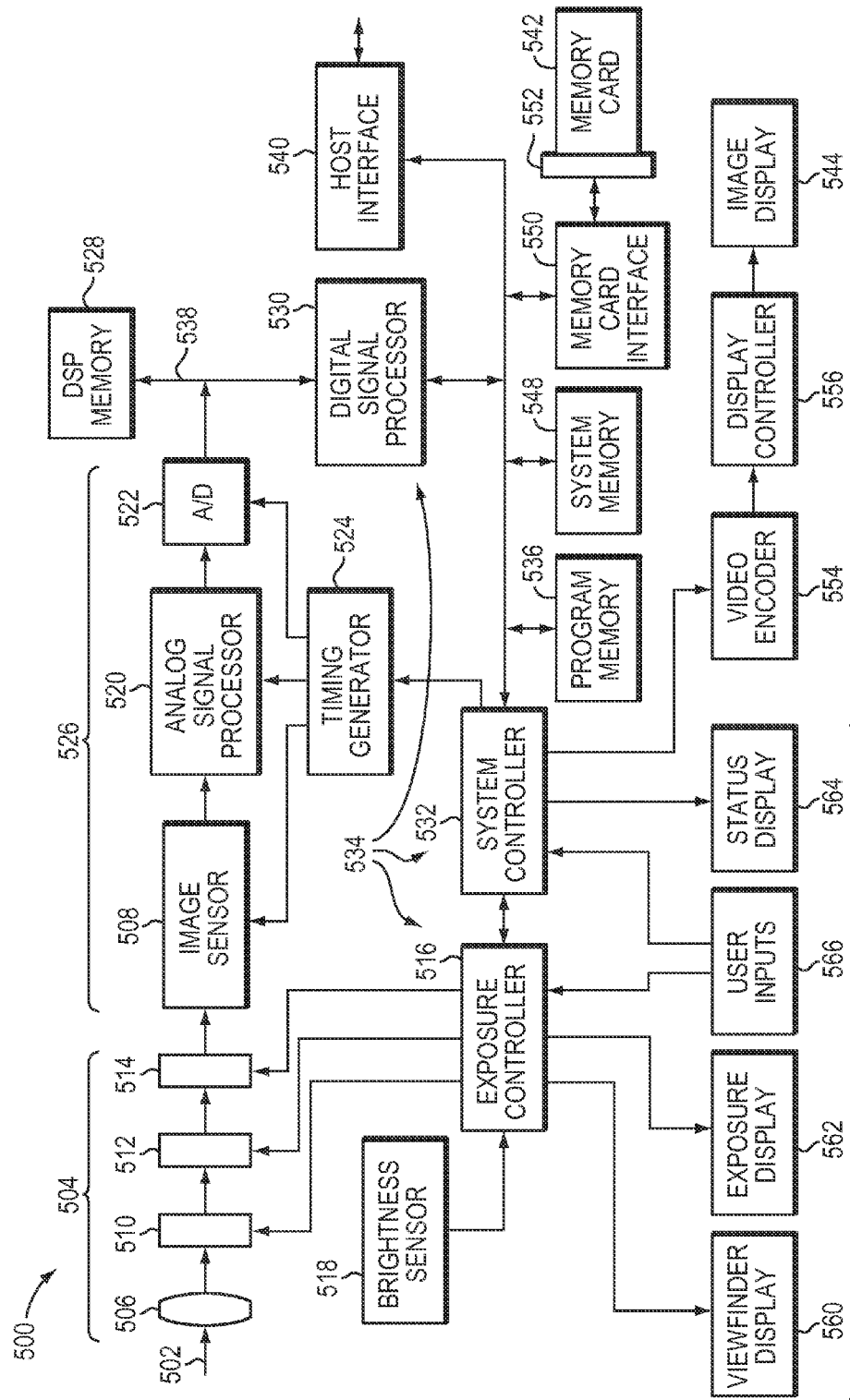
FIG. 5 is a block diagram of an image capture device incorporating a CCD image sensor in accordance with various embodiments of the invention.

Embodiments of the present invention may be utilized in a variety of different systems and devices, including, for example, digital cameras, digital video cameras, scanners, and telescopes. FIG. 5 illustrates an exemplary image capture device 500 in accordance with an embodiment of the invention. Image capture device 500 is implemented as a digital camera in FIG. 5.

Light 502 from a subject scene to be imaged is input to an imaging stage 504, where the light is focused by a lens 506 to form an image on a CCD image sensor 508 (which may include or consist essentially of, e.g., CCD image sensor 200 of FIG. 2A, and may include controller 280 of FIG. 2B, and may be operated in either or both of the two imaging modes described above). Image sensor 508 converts the incident light to an electrical signal for each pixel thereof. The pixels of image sensor 508 may have a color filter array (e.g., a Bayer filter, not shown) applied thereover so that each pixel senses a portion of the imaging spectrum.

The light passes through the lens 506 and a filter 510 prior to being sensed by image sensor 508. Optionally, light 502 passes through a controllable iris 512 and a mechanical shutter 514. The filter 510 may include or consist essentially of an optional neutral-density filter for imaging brightly lit scenes. An exposure controller 516 responds to the amount of light available in the scene, as metered by a brightness sensor block 518, and regulates the operation of filter 510, iris 512, shutter 514, and the integration time (or exposure time) of image sensor 508 to control the brightness of the image as sensed by image sensor 508.

This description of a particular camera configuration will be familiar to those skilled in the art, and it will be obvious that many variations and additional features are, or may be, present. For example, an autofocus system may be added, or the lenses may be detachable and interchangeable. It will be understood that embodiments of the present invention may be applied to any type of digital camera, where similar functionality is provided by alternative components. For example, the digital camera may be a relatively simple point-and-shoot digital camera, where shutter 514 is a relatively simple movable blade shutter, or the like, instead of a more complicated focal plane arrangement as may be found in a digital single-lens reflex camera. Embodiments of the invention may also be incorporated within imaging components included in simple camera devices such as those found in, e.g., mobile phones and automotive vehicles, which may be operated without controllable irises 512 and/or mechanical shutters 514. Lens 506 may be a fixed focal-length lens or a zoom lens.

As shown, the analog signal from image sensor 508 (corresponding to the amount of charge collected from one or more pixels) is processed by analog signal processor 520 and applied to one or more analog-to-digital (A/D) converters 522. A timing generator 524 produces various clocking signals to select rows, columns, or pixels in image sensor 508, to transfer charge out of image sensor 508, and to synchronize the operations of analog signal processor 520 and A/D converter 522. An image sensor stage 526 (all or parts of which may correspond to CCD image sensor 200 as depicted in FIG. 2A and may include controller 280 of FIG. 2B) may include image sensor 508, analog signal processor 520, analog-to-digital (A/D) converter 522, and timing generator 524. The resulting stream of digital pixel values from A/D converter 522 is stored in a memory 528 associated with a digital signal processor (DSP) 530.

DSP 530 is one of three processors or controllers in the illustrated embodiment, which also includes a system controller 532 and exposure controller 516. Although this partitioning of camera functional control among multiple controllers and processors is typical, these controllers or processors are combined in various ways without affecting the functional operation of the camera and the application of embodiments of the present invention. These controllers or processors may include or consist essentially of one or more DSP devices, microcontrollers, programmable logic devices, or other digital logic circuits. Although a combination of such controllers or processors has been described, it should be apparent that one controller or processor may be designated to perform all of the required functions. All of these variations may perform the same function and fall within the scope of various embodiments of the invention, and the term "processing stage" is utilized herein to encompass all of this functionality within one phrase, for example, as in processing stage 534 in FIG. 5.

In the illustrated embodiment, DSP 530 manipulates the digital image data in memory 528 according to a software program stored in a program memory 536 and copied to memory 528 for execution during image capture. DSP 530 executes the software necessary for image processing in an embodiment of the invention. Memory 528 may include or consist essentially of any type of random access memory, such as SDRAM. A bus 538, a pathway for address and data signals, connects DSP 530 to its related memory 528, A/D converter 522, and other related devices.

System controller 532 controls the overall operation of the image capture device 500 based on a software program stored in program memory 536, which may include or consist essentially of, e.g., flash EEPROM or other nonvolatile memory. This memory may also be used to store image sensor calibration data, user setting selections, and/or other data to be preserved when the image capture device 500 is powered down. System controller 532 controls the sequence of image capture by directing exposure controller 516 to operate lens 506, filter 510, iris 512, and shutter 514 as previously described, directing timing generator 524 to operate image sensor 508 and associated elements, and directing DSP 530 to process the captured image data. After an image is captured and processed, the final image file stored in memory 528 may be transferred to a host computer via an interface 540, stored on a removable memory card 542 or other storage device, and/or displayed for the user on an image display 544.

A bus 546 includes a pathway for address, data and control signals, and connects system controller 532 to DSP 830, program memory 536, a system memory 548, host interface 540, memory card interface 550, and/or other related devices. Host interface 540 provides a high-speed connection to a personal computer or other host computer for transfer of image data for display, storage, manipulation, and/or printing. This interface may include or consist essentially of an IEEE 1394 or USB 2.0 serial interface or any other suitable digital interface. Memory card 542 is typically a Compact Flash card inserted into a socket 552 and connected to system controller 532 via memory card interface 550. Other types of storage that may be utilized include, without limitation, PC-Cards, MultiMedia Cards, and/or Secure Digital cards.

Processed images may be copied to a display buffer in system memory 548 and continuously read out via a video encoder 554 to produce a video signal. This signal may be output directly from image capture device 500 for display on an external monitor, or processed by a display controller 556 and presented on image display 544. This display is typically an active-matrix color liquid crystal display, although other types of displays may be utilized.

A user interface 558, including all or any combination of a viewfinder display 560, an exposure display 562, a status display 564, image display 544, and user inputs 566, may be controlled by one or more software programs executed on exposure controller 516 and system controller 532. User inputs 566 typically include some combination of buttons, rocker switches, joysticks, rotary dials, and/or touch screens. Exposure controller 516 operates light metering, exposure mode, autofocus and other exposure functions. System controller 532 manages the graphical user interface (GUI) presented on one or more of the displays, e.g., on image display 544. The GUI typically includes menus for making various option selections and review modes for examining captured images.

Exposure controller 516 may accept user inputs selecting exposure mode, lens aperture, exposure time (shutter speed), and exposure index or ISO speed rating and directs the lens and shutter accordingly for subsequent captures. Optional brightness sensor 518 may be employed to measure the brightness of the scene and provide an exposure meter function for the user to refer to when manually setting the ISO speed rating, aperture, and shutter speed. In this case, as the user changes one or more settings, the light meter indicator presented on viewfinder display 560 tells the user to what degree the image will be over- or under-exposed. In an alternate case, brightness information is obtained from images captured in a preview stream for display on image display 544. In an automatic exposure mode, the user changes one setting and exposure controller 516 automatically alters another setting to maintain correct exposure, e.g., for a given ISO speed rating when the user reduces the lens aperture, exposure controller 516 automatically increases the exposure time to maintain the same overall exposure.

The foregoing description of an image capture device will be familiar to one skilled in the art. It will be obvious that there are many variations that are possible and may be selected to reduce the cost, add features, or improve the performance thereof.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of image capture utilizing an image sensor comprising an imaging array (i) comprising a plurality of columns of photo-sensitive regions (PSRs) each associated with a vertical CCD (VCCD) and (ii) having at least first and second different and independently controllable regions, the method comprising:
   in a first image-capture mode:
      acquiring an image via accumulation of charge in the PSRs of both first and second regions,
      transferring accumulated charge in the PSRs of the first region to VCCDs of the first region,
      transferring accumulated charge in the PSRs of the second region to VCCDs of the second region,
      transferring charge in the VCCDs of the first and second regions to one or more horizontal CCDs (HCCDs) electrically connected to the VCCDs, and
      reading out charge from the one or more HCCDs via one or more output circuits electrically coupled to each HCCD; and
   in a second image-capture mode:
      acquiring a first image via accumulation of charge in the PSRs of the first region,
      transferring accumulated charge in the PSRs of the first region corresponding to the first image to VCCDs of the first region,
      transferring charge corresponding to the first image from the VCCDs of the first region to VCCDs of the second region,
      acquiring a second image via accumulation of charge in the PSRs of the first region,
      transferring accumulated charge in the PSRs of the first region corresponding to the second image to VCCDs of the first region,
      transferring (i) charge in the VCCDs of the first region corresponding to the second image and (ii) charge in the VCCDs of the second region corresponding to the first image to one or more HCCDs electrically connected to the VCCDs, and
      reading out charge from the one or more HCCDs via one or more output circuits electrically coupled to each HCCD.

2. The method of claim 1, wherein, in the first image-capture mode, charge in the VCCDs of the first and second regions is transferred to a single HCCD.

3. The method of claim 2, wherein charge is read out from the single HCCD via one output circuit.

4. The method of claim 2, wherein charge is read out from the single HCCD via two different output circuits.

5. The method of claim 1, wherein, in the first image-capture mode, charge in the VCCDs of the first region is transferred to a first HCCD and charge in the VCCDs of the second region is transferred to a second HCCD different from the first HCCD.

6. The method of claim 5, wherein charge is read out of the first HCCD via one output circuit electrically coupled thereto and charge is read out of the second HCCD via one output circuit electrically coupled thereto.

7. The method of claim 5, wherein charge is read out of the first HCCDs via two different output circuits electrically coupled thereto and charge is read out of the second HCCD via two different output circuits electrically coupled thereto.

8. The method of claim 1, wherein, in the first image-capture mode, accumulated charge in the PSRs of the first region is transferred to VCCDs of the first region and accumulated charge in the PSRs of the second region is transferred to VCCDs of the second region simultaneously.

9. The method of claim 1, wherein, in the second image-capture mode, at least a portion of the charge corresponding to the second image is accumulated in the PSRs of the first region during transfer of charge corresponding to the first image from the VCCDs of the first region to VCCDs of the second region.

10. The method of claim 1, wherein, in the second image-capture mode, charge accumulates in the PSRs of the second region during at least one of (i) accumulation of charge in the PSRs of the first region during acquisition of the first image or (ii) accumulation of charge in the PSRs of the first region during acquisition of the second image.

11. The method of claim 1, wherein, in the second image-capture mode, charge in the VCCDs of the first and second regions is transferred to a single HCCD.

12. The method of claim 11, wherein charge is read out from the single HCCD via one output circuit.

13. The method of claim 11, wherein charge is read out from the single HCCD via two different output circuits.

14. The method of claim 1, wherein, in the second image-capture mode, charge in the VCCDs of the first region is transferred to a first HCCD and charge in the VCCDs of the second region is transferred to a second HCCD different from the first HCCD.

15. The method of claim 14, wherein charge is read out of the first HCCD via one output circuit electrically coupled thereto and charge is read out of the second HCCD via one output circuit electrically coupled thereto.

16. The method of claim 14, wherein charge is read out of the first HCCDs via two different output circuits electrically coupled thereto and charge is read out of the second HCCD via two different output circuits electrically coupled thereto.

17. The method of claim 1, wherein each of the first and second regions comprises a plurality of contiguous rows of PSRs.

18. The method of claim 1, further comprising, in the second image-capture mode:
  acquiring a third image via accumulation of charge in the PSRs of the second region;
  transferring accumulated charge in the PSRs of the second region corresponding to the third image to VCCDs of the second region;
  transferring charge corresponding to the third image from the VCCDs of the second region to VCCDs of the first region;
  acquiring a fourth image via accumulation of charge in the PSRs of the second region;
  transferring accumulated charge in the PSRs of the second region corresponding to the fourth image to VCCDs of the second region;
  transferring (i) charge in the VCCDs of the second region corresponding to the fourth image and (ii) charge in the VCCDs of the first region corresponding to the third image to one or more HCCDs electrically connected to the VCCDs; and
  reading out charge from the one or more HCCDs via one or more output circuits electrically coupled to each HCCD.

19. The method of claim 18, wherein charge accumulates in the PSRs of the first region during at least one of (i) accumulation of charge in the PSRs of the second region during acquisition of the third image or (ii) accumulation of charge in the PSRs of the second region during acquisition of the fourth image.

20. An image sensor comprising:
  an imaging array (i) comprising a plurality of columns of photo-sensitive regions (PSRs) each associated with a vertical CCD (VCCD) and (ii) having at least first and second different and independently controllable regions;
  one or more horizontal CCDs (HCCDs) electrically connected to the VCCDs;
  one or more output circuits electrically coupled to each HCCD; and
  a control system configured to:
    in a first image-capture mode:
      acquire an image via accumulation of charge in the PSRs of both first and second regions,
      transfer accumulated charge in the PSRs of the first region to VCCDs of the first region,
      transfer accumulated charge in the PSRs of the second region to VCCDs of the second region,
      transfer charge in the VCCDs of the first and second regions to at least one of the HCCDs, and
      read out charge from each of the at least one of the HCCDs via one or more output circuits electrically coupled thereto, and
    in a second image-capture mode:
      acquire a first image via accumulation of charge in the PSRs of the first region,
      transfer accumulated charge in the PSRs of the first region corresponding to the first image to VCCDs of the first region,
      transfer charge corresponding to the first image from the VCCDs of the first region to VCCDs of the second region,
      acquire a second image via accumulation of charge in the PSRs of the first region,
      transfer accumulated charge in the PSRs of the first region corresponding to the second image to VCCDs of the first region,
      transfer (i) charge in the VCCDs of the first region corresponding to the second image and (ii) charge in the VCCDs of the second region corresponding to the first image to at least one of the HCCDs, and
      read out charge from each of the at least one of the HCCDs via one or more output circuits electrically coupled thereto.

21. A method of image capture utilizing an image sensor comprising an imaging array (i) comprising a plurality of columns of photo-sensitive regions (PSRs) each associated with a vertical CCD (VCCD) and (ii) having at least first and second different and independently controllable regions, the method comprising:
  acquiring a first image via accumulation of charge in the PSRs of the first region, charge accumulating in the PSRs of the second region thereduring;
  transferring accumulated charge in the PSRs of the first region corresponding to the first image to VCCDs of the first region;
  transferring charge corresponding to the first image from the VCCDs of the first region to VCCDs of the second region;
  acquiring a second image via accumulation of charge in the PSRs of the first region, charge accumulating in the PSRs of the second region thereduring;
  transferring accumulated charge in the PSRs of the first region corresponding to the second image to VCCDs of the first region;
  transferring (i) charge in the VCCDs of the first region corresponding to the second image and (ii) charge in the VCCDs of the second region corresponding to the first image to one or more HCCDs electrically connected to the VCCDs; and
  reading out charge from the one or more HCCDs via one or more output circuits electrically coupled to each HCCD.

22. An image sensor comprising:
  an imaging array (i) comprising a plurality of columns of photo-sensitive regions (PSRs) each associated with a vertical CCD (VCCD) and (ii) having at least first and second different and independently controllable regions;
  one or more horizontal CCDs (HCCDs) electrically connected to the VCCDs;
  one or more output circuits electrically coupled to each HCCD; and
  a control system configured to:

acquire a first image via accumulation of charge in the PSRs of the first region, charge accumulating in the PSRs of the second region thereduring, transfer accumulated charge in the PSRs of the first region corresponding to the first image to VCCDs of the first region, transfer charge corresponding to the first image from the VCCDs of the first region to VCCDs of the second region, acquire a second image via accumulation of charge in the PSRs of the first region, charge accumulating in the PSRs of the second region thereduring, transfer accumulated charge in the PSRs of the first region corresponding to the second image to VCCDs of the first region, transfer (i) charge in the VCCDs of the first region corresponding to the second image and (ii) charge in the VCCDs of the second region corresponding to the first image to at least one of the HCCDs, and read out charge from each of the at least one of the HCCDs via one or more output circuits electrically coupled thereto.

\* \* \* \* \*